US008413157B2

(12) United States Patent
Palczak et al.

(10) Patent No.: US 8,413,157 B2
(45) Date of Patent: Apr. 2, 2013

(54) MECHANISM FOR CONTINUOUSLY AND UNOBTRUSIVELY VARYING STRESS ON A COMPUTER APPLICATION WHILE PROCESSING REAL USER WORKLOADS

(76) Inventors: Charles Palczak, Littleton, CO (US); Robert T. Goettge, Mt. Crested Butte, CO (US)

( * ) Notice: Subject to any disclaimer, the term of this patent is extended or adjusted under 35 U.S.C. 154(b) by 252 days.

(21) Appl. No.: 12/850,118

(22) Filed: Aug. 4, 2010

(65) Prior Publication Data
US 2011/0035753 A1    Feb. 10, 2011

Related U.S. Application Data

(60) Provisional application No. 61/273,606, filed on Aug. 6, 2009.

(51) Int. Cl.
*G06F 9/46* (2006.01)
(52) U.S. Cl. ......................................... 718/104; 718/105
(58) Field of Classification Search ........... 718/104–105
See application file for complete search history.

(56) References Cited

U.S. PATENT DOCUMENTS

| 6,324,492 B1 * | 11/2001 | Rowe ............................. 703/13 |
| 7,885,842 B1 * | 2/2011 | Bartolini et al. ............ 709/226 |
| 2005/0240935 A1 * | 10/2005 | Ramanathan ................ 718/105 |
| 2006/0265490 A1 * | 11/2006 | Pishevar et al. ............. 709/223 |
| 2008/0288739 A1 * | 11/2008 | Bamba et al. ................ 711/172 |
| 2008/0306950 A1 * | 12/2008 | Richards et al. ................ 707/8 |
| 2009/0177775 A1 * | 7/2009 | Radia et al. ................. 709/226 |
| 2010/0125565 A1 * | 5/2010 | Burger et al. ................ 707/713 |
| 2010/0138688 A1 * | 6/2010 | Sykes et al. ...................... 714/4 |
| 2010/0192156 A1 * | 7/2010 | Hollingsworth .............. 718/104 |

* cited by examiner

*Primary Examiner* — Johnna Loftis
*Assistant Examiner* — Sujay Koneru
(74) *Attorney, Agent, or Firm* — Blakely, Sokoloff, Taylor & Zafman LLP

(57) ABSTRACT

A mechanism for varying stress on a software application while processing real user workloads is disclosed. A method of embodiments of the invention includes configuring application resources for a recovery configuration whose service levels are satisfactory. The application resources are associated with the software application. The method further includes configuring the application resources for stress configurations to affect service levels, and transitioning the application resources from the recovery configuration to a stress configuration for a time duration, while the application resources of the stress configuration are transitioned back to the recovery configuration. The method further includes determining a next stress configuration and a time duration combination to vary stress such that user service levels are unobtrusively affected by limiting the time duration in inverse relation to an uncertainty in predicting the service level impact of the stress configuration.

20 Claims, 17 Drawing Sheets

MECHANISM FOR CONTINUOUSLY AND UNOBTRUSIVELY VARYING STRESS ON A COMPUTER APPLICATION WHILE PROCESSING REAL USER WORKLOADS

CROSS-REFERENCE TO RELATED APPLICATIONS

This application claims priority from a U.S. Provisional Application No. 61/273,606, filed on Aug. 6, 2009.

TECHNICAL FIELD

The embodiments of the invention relate generally to computer systems and, more specifically, relate to a mechanism for varying stress on a software application while processing real user workloads.

BACKGROUND

Computer applications ("software applications" or "software programs") have quality measures called service levels, which include response time, availability and error rate; however, maintaining these service levels while the applications are subjected to increased usage, data volumes, and processing requirements is complex and, often, unachievable. One key to maintaining service levels is to collect data while the application is subjected to stress variations that approach its stress limits. This data can be analyzed to assist in various design, maintenance, and management tasks such as (a) automatically adding and removing resources available to the application, for example, additional computers or computing components, (b) identifying software and hardware bottlenecks to assist in performance and scalability tuning, (c) managing the application with the goal of reducing the amount of hardware or software resources required by an application, and (d) proactively identifying potential service level problems before being encountered by users of the application.

Certain techniques analyze data based on stress conditions that may occur naturally in operational situations. However, these techniques are often unable to obtain data collected during conditions that approach stress limits.

Other techniques are based on generating artificial workloads via execution of load scripts. While these techniques can be used to collect data during a wide range of stress conditions in both operational and non-operational environments, data collected during these conditions is often significantly different from data collected during stress conditions of real user workloads running in a real application environment with dependencies on real external services or databases. The data collected during these stress conditions is of little value for the aforementioned maintenance and management tasks.

Certain techniques add artificial workloads to real user workloads in volumes intended to cause application stress. These techniques are inefficient because they are known to increase overhead on the application's resources that can obtrusively affect user service levels that results in decreased user satisfaction and increased costs.

Other available techniques require human involvement in creating and updating load scripts that are often large and thus, serve as a barrier to revising the scripts when the application or workload characteristics change. Stress data collected while running old load scripts does not reflect current operational conditions and thus, prevents maintenance and management tasks from being effectively performed.

Some available techniques vary the stress on a horizontally scalable multi-node software application in an operational situation by using a load balancer to either reduce the number of nodes available to the application or otherwise varying the load on each node. These techniques obtrusively affect user service levels which decrease user satisfaction with the application.

SUMMARY

Embodiments of the inventions provide a mechanism for varying stress on a software application while processing real user workloads. A method of embodiments of the invention includes configuring application resources for a recovery configuration whose service levels are satisfactory. The application resources are associated with the software application. The method further includes configuring the application resources for stress configurations to affect service levels, and transitioning the application resources from the recovery configuration to a stress configuration for a time duration, while the application resources of the stress configuration are transitioned back to the recovery configuration. The method further includes determining a next stress configuration and a time duration combination to vary stress such that user service levels are unobtrusively affected by limiting the time duration in inverse relation to an uncertainty in predicting the service level impact of the stress configuration.

In one embodiment, a system of embodiments of the invention includes a processor communicably coupled to a memory on a host computer system. The host computer system includes a stress varying mechanism. The stress varying mechanism is operable to configure application resources for a recovery configuration whose service levels are satisfactory. The application resources are associated with the software application. The stress varying mechanism is further operable to configure the application resources for stress configurations to affect service levels, and transition the application resources from the recovery configuration to a stress configuration for a time duration, while the application resources of the stress configuration are transitioned back to the recovery configuration. The stress varying mechanism is further operable to determine a next stress configuration and a time duration combination to vary stress such that user service levels are unobtrusively affected by limiting the time duration in inverse relation to an uncertainty in predicting the service level impact of the stress configuration.

In one embodiment, an article of manufacture of embodiments of the invention includes a machine-readable storage medium including data that, when accessed by a machine, cause the machine to perform operations comprising configuring application resources for a recovery configuration whose service levels are satisfactory. The application resources are associated with the software application. The operations performed by the machine further include configuring the application resources for stress configurations to affect service levels, and transitioning the application resources from the recovery configuration to a stress configuration for a time duration, while the application resources of the stress configuration are transitioned back to the recovery configuration. The operations performed by the machine further include determining a next stress configuration and a time duration combination to vary stress such that user service levels are unobtrusively affected by limiting the time duration in inverse relation to an uncertainty in predicting the service level impact of the stress configuration.

In one embodiment, an apparatus of embodiments of the invention includes a processor communicably coupled to a memory on a computer system. The processor operates to configure application resources for a recovery configuration whose service levels are satisfactory. The application resources are associated with the software application. The processor is further operable to configure the application resources for stress configurations to affect service levels, and transition the application resources from the recovery configuration to a stress configuration for a time duration, while the application resources of the stress configuration are transitioned back to the recovery configuration. The processor is further operable to determine a next stress configuration and a time duration combination to vary stress such that user service levels are unobtrusively affected by limiting the time duration in inverse relation to an uncertainty in predicting the service level impact of the stress configuration.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide how application resources are allocated to a software application and the allocations, by varying the time durations of the allocations, can cause the application stress to approach its limits. This technique is beneficial because it overcomes the issue where analysis of naturally occurring stress does not reliably provide enough data to be useful. In one embodiment, a stress varying mechanism is employed to facilitate varying stress conditions while running real user workloads in a real environment with dependencies on real external services or databases. This resolves the issue of data collected while under stress generated by artificial workloads is often significantly different from data collected while the software application is subjected to more realistic stress. Further, these processes unobtrusively affect user service levels and do not increase the total resource requirements of the software application. This technique is used to reduce the increased resource costs and raise the decreased user satisfaction. Further, embodiments of the invention are performed automatically, dynamically, and even continuously while adapting to workload and application changes. This is beneficial in dealing with the issue of data collected during stress conditions becoming inaccurate over time because of the delays inherent in performing human intensive activities.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations as set forth in the detailed examples below.

Figure 1:
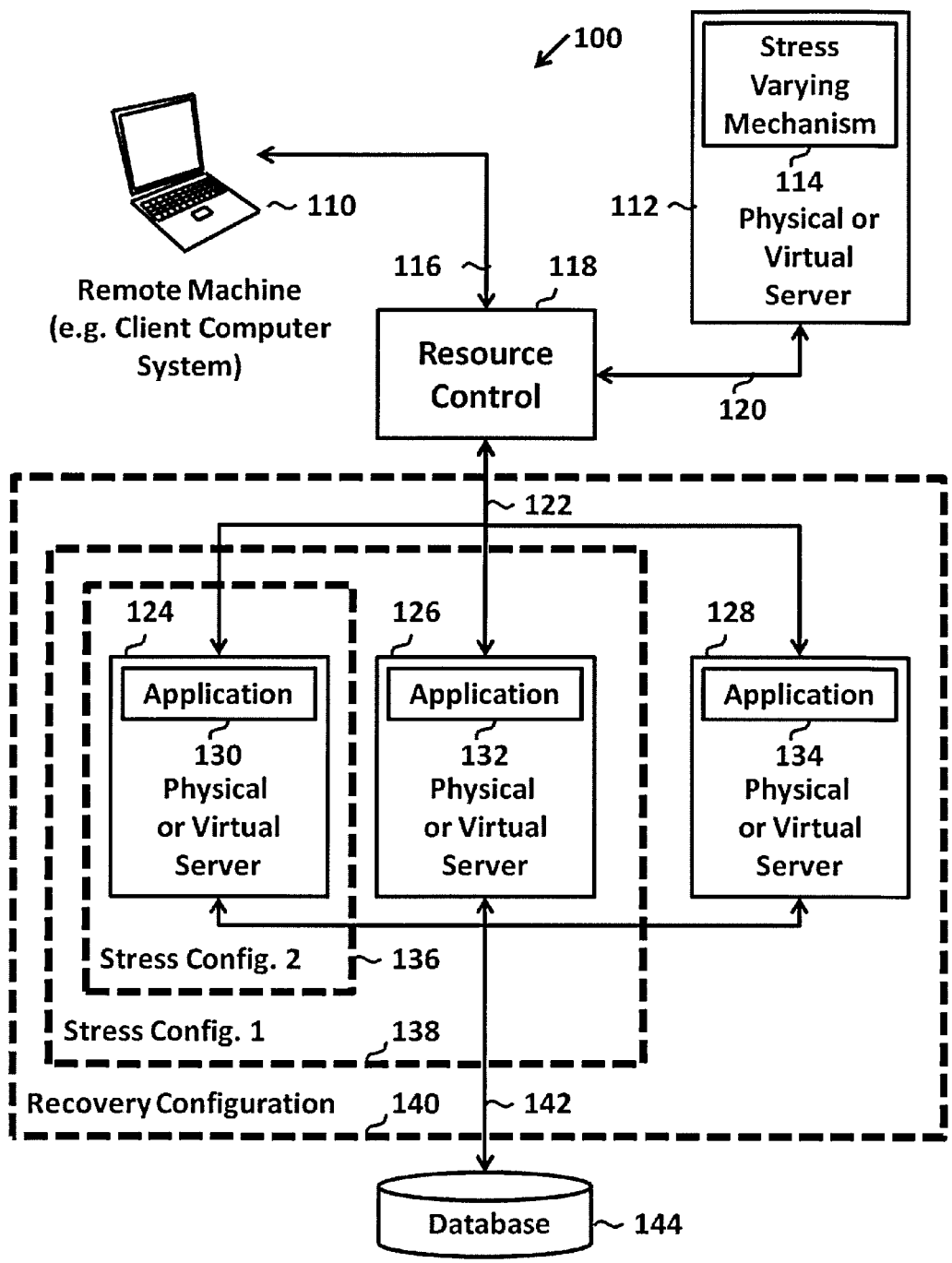
FIG. 1 illustrates a system for varying stress on software applications while processing real user workloads according to one embodiment of the invention.

FIG. 1 illustrates a stress varying system 100 employing stress varying mechanism 114 for varying stress relating to software applications while processing real user workloads according to one embodiment of the invention. In the illustrated embodiment, varying stress mechanism 114 is shown as running on a physical or virtual computer system (e.g., server computer system, also herein referred to as "server") 112, connected to resource control 118 which distributes its load to identical software application instances 130, 132, 134 ("application instances") running on three physical or virtual servers 124, 126, 128 which in turn are connected to a database 144. Resource control 118 may include hardware (e.g., circuitry, dedicated or programmable logic, microcode, etc.), or software or a combination thereof and serve as a load balancer. In one embodiment, the stress varying mechanism 114 includes software, such as software modules and entities. In one embodiment, stress varying mechanism 114 includes software, the stress varying mechanism 114 may also include some hardware, such as hardware components or circuitry, or a combination of software (e.g., instructions run on a processing device) or a combination thereof, such as firmware. Users (e.g., a software application user, such as administrator, software developer, programmer, end-user, etc., or another software application), via a client computer system 110 ("client"), connect to or access the application instances 130, 132, 134 using the resource control 118. Although FIG. 1 only shows three software application instances 130, 132, 134 running on three physical or virtual servers 124, 126, 128, the number of physical servers or virtual servers can be as low as a single server and as high as any number of servers that can be controlled by the resource control 118. The number of application instances 130, 132, 134 and servers 124, 126, 128 are limited to three in the illustrated embodiment merely to be used as an example and for brevity, clarity, and ease of understanding. Additionally, the resource control 118 can be implemented as software running on a physical or virtual server. In one embodiment, the stress varying mechanism 114, described and illustrated herein, performs other methods as described throughout this document, such as with respect to the subsequent Figures.

In one embodiment, the stress varying mechanism 114 sends commands to the resource control 118 to add and remove physical and virtual servers 124, 126, 128 containing instances of the software application 130, 132, 134. This has the effect of reducing the ability of the application instances 130, 132, 134 to respond to load from the users provided via the client 110. Additionally, in some embodiments, all of the software application instances 130, 132, 134 running on the physical or virtual servers 124, 126, 128 continue to process load from the users through the client 110 but the load directed to the physical or virtual servers is unbalanced. The physical and virtual servers 124, 126, 128 are grouped into configurations 136, 138, 140. When load is directed to the set of three application instances 124, 126, 128 on physical or virtual servers 130, 132, 134, the software application is regarded as having satisfactory service levels and this configuration is designated the "Recovery Configuration" 140. When load is directed to run on two of the three application instances, such as application instances 130, 132, running on smaller sets of physical or virtual servers, such as 124 and 124, 126, the software application service levels are potentially degraded and such configurations are designated as "Stress Configuration 2" 136 and "Stress Configuration 1" 138, respectively. In other embodiments, with fewer or more physical or virtual servers, combinations of physical or virtual servers and application instances can be grouped together to form any number and types of different stress and recovery configurations. In one embodiment, data may be acquired from monitoring software that provides service level and stress data to the stress varying mechanism 114. The monitoring software resides on one of the virtual or physical servers 130, 132, 134 that host the computer application instances 124, 126, 128, or may reside on a physical or virtual hardware that hosts the resource control 118, or may offer the data to the stress varying mechanism 114 as a network accessible service.

Figure 2:
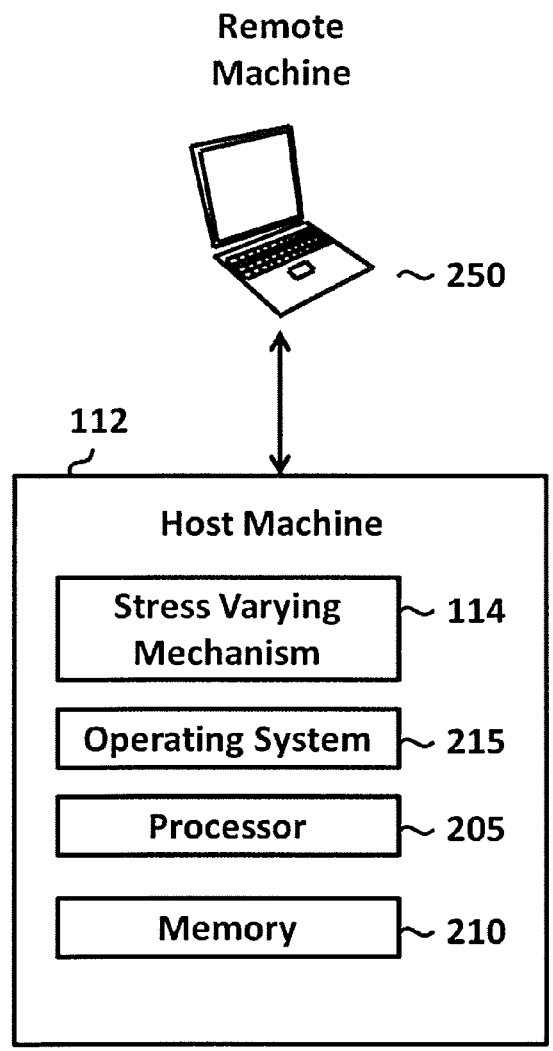
FIG. 2 illustrates a host machine employing a stress varying mechanism according to one embodiment of the invention.

FIG. 2 illustrates a host machine 112 employing stress varying mechanism 114 according to one embodiment of the invention. Host machine 112 hosts a hardware platform having a processor 205 that works with an operating system 215 (e.g., Windows®, Linux®, Unix®, Mac®, etc.) that serves as an interface between hardware or physical resources of the host machine 112 and the user. The hardware platform may also include memory devices 210 and other network devices, network interface cards, physical and virtual drives and drivers, etc. Host machine 112 is shown in communication with a computer system 250 that includes any one or more of the client computer system 110, the resource control 118, and physical or virtual server computer systems 124, 126, 128 of FIG. 1.

In one embodiment, the host machine 112 includes the stress varying mechanism 114 for varying stress relating to software applications while processing real user workloads. Host machine 112 may further includes any number of virtual machines (supported by a virtual machine environment, such as VMware®) to run the stress varying mechanism 114 and/or other software programs.

Figure 3:
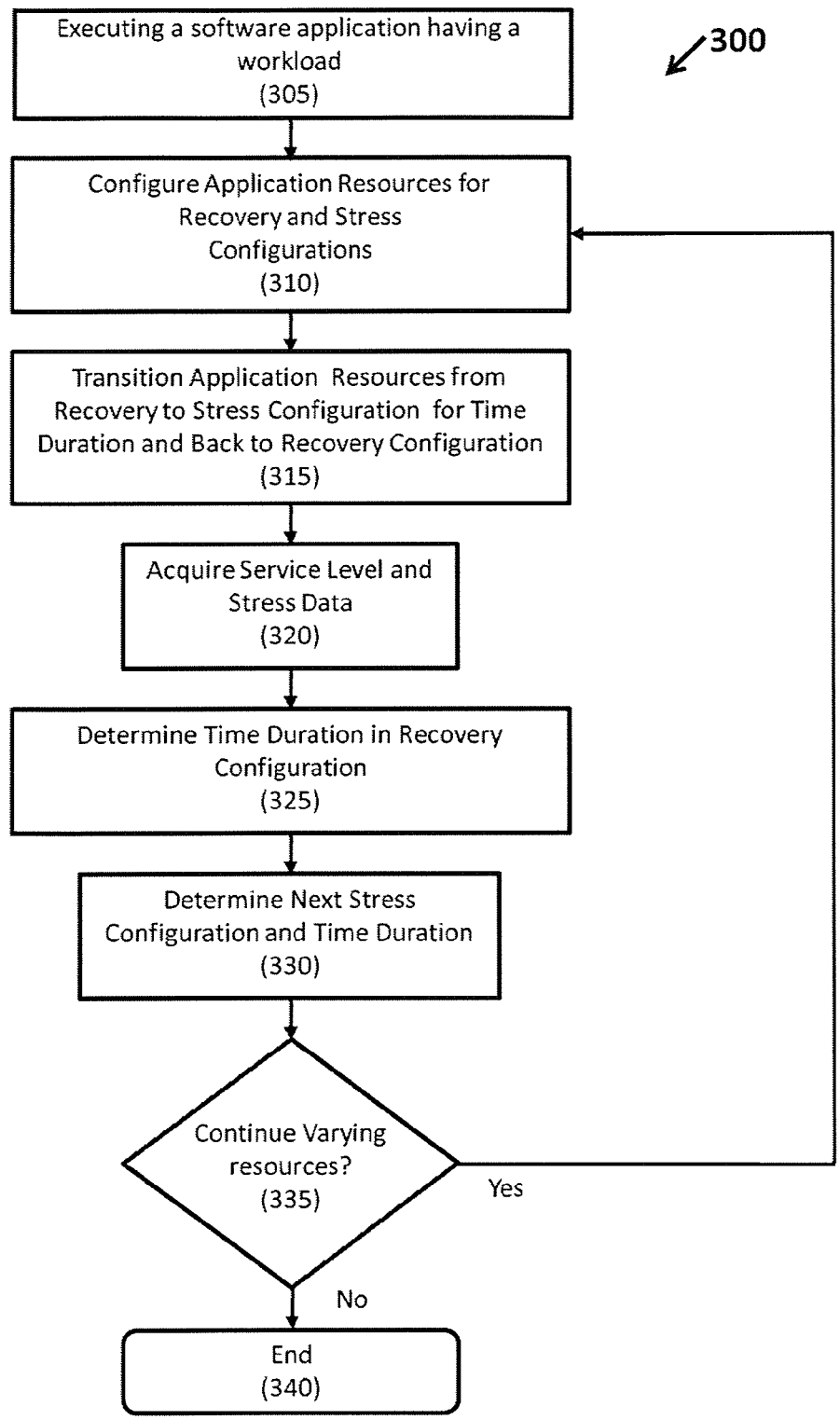
FIG. 3 illustrates a method for describing temporal relationships of functions of a stress varying mechanism according to one embodiment of the invention.

FIG. 3 illustrates a method 300 for describing temporal relationships of the functions according to one embodiment of the invention. In one embodiment, the method 300 may be performed by the stress varying mechanism of FIG. 1 for continuously and unobtrusively varying stress on a software application while processing real user workloads. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices.

Method 300 starts at with block 305 with running of a software application having a workload. At block 310, in one embodiment, application resources are configured for recovery and/or stress. In one embodiment, the application resources are readied for use as configurations of two types, such as a recovery configuration and a stress configuration. Application resources are configured to recovery or stress as defined by the stress varying mechanism at it proceeds including configuring in a continuous manner.

At block 315, application resources are transitioned from the recovery configuration stage to the stress configuration stage for a time duration and then they are moved back to recovery configuration. In one embodiment, the application resources are maintained in recovery configuration and then transitioned to stress configuration and then remain in stress configuration for a duration of time as determined by the stress varying mechanism. After maintaining the application resources in the stress configuration stage for the time duration, they are transitioned back to the recovery configuration stage. This recovery configuration is maintained until another transition to a stress configuration is necessitated. This function interfaces with the software application through a resource control mechanism of the stress varying mechanism for commanding the aforementioned configuration transitions. In one embodiment, recovery and stress configuration stages, the switching between them, and the durations of time for maintaining them in a particular configuration stage are determined by other functions of the method. These functions include, for example, block 325.

At block 320, service level and stress data are acquired from the monitoring software. Service level data may include, for example, measurements of user service levels such as response times. Stress data may include, for example, metrics which vary with the variations of stress created by the stress varying mechanism. In one embodiment, monitoring software provides service level and stress data to the stress varying mechanism and resides on the virtual or physical machines that host the software application or on the physical or virtual hardware that hosts the resource control mechanism, or may offer data to the stress varying mechanism as a network accessible service. Acquiring this data may include data processing and reduction prior to making the data available for subsequent use and providing interface and data acquisition control of the monitoring software.

At block 325, a determination is made as to whether the service level and stress data indicate a current or potential future obtrusive impact on user service levels. If they do, a proper time duration to maintain the recovery configuration or maintain the recovery configuration waiting for new data is determined, which ensures an unobtrusive operation. Because the stress varying mechanism transitions back to the recovery configuration after a stress configuration, at block 325, the application resources remain recovery configured. At block 330, a determination is made as to the next stress configuration and its time duration including selecting a combination of stress configuration and its relevant time duration such that stress is varied on the software application while unobtrusively affecting user service levels. In one embodiment, the operation of block 330 may limit the time duration of the stress configuration in inverse relation to the uncertainty involved in predicting the service level impact of the stress configuration. Limiting time duration in stress configuration ensures that the fraction of time or amount of workload which may be impacted by varying stress is limited to an acceptably small value. Thus, even with uncertain prediction of the impact of a stress configuration on user service levels, the impact is limited enough to be unobtrusive. Further, this technique places no constraints on the composition of recovery and stress configurations of the application resources, and the stress varying mechanism may change these configurations during its operation. Moreover, in one embodiment, block 330 provides for determination of stress configuration based on fixed sets of application resources or may determine stress configurations as it operates while the operation of block 310 performs new configurations as determined by the process of block 330. In one embodiment, stress configuration is determined to have different volumes of workload directed to different application resources.

In another embodiment, various stress configurations are ordered in terms of the available computing capacity so that varying configurations can reduce the amount of computing capacity that is available and allocated to the software application. In yet another embodiment, at block 330, a determination is made as to whether to compute a maximum stress limit that is used to determine how the stress configuration and time duration combinations are selected to unobtrusively affect service levels. This limit is computed and updated by, first, computing a stress metric based on stress data and examining the service level data corresponding to the stress data, and, second, updating the maximum stress limit if the service level shows degradation sufficiently large enough that if selected again for a longer time duration, it would fail to have an unobtrusive effect on service levels. Prior to making future transitions to various stress configurations, the stress varying mechanism facilitates transitioning to a stress configuration that prevents the predicted stress metric from exceeding the maximum stress limit.

At block 335, a determination is made as to whether the processes of blocks 310 thru 330 are to be repeated. If yes, the method returns to block 310 and continues from there by executing and transitioning between the recovery and various stress configurations and thus, varying the stress on the software application. If not, the method ends at block 340.

Figure 4A:
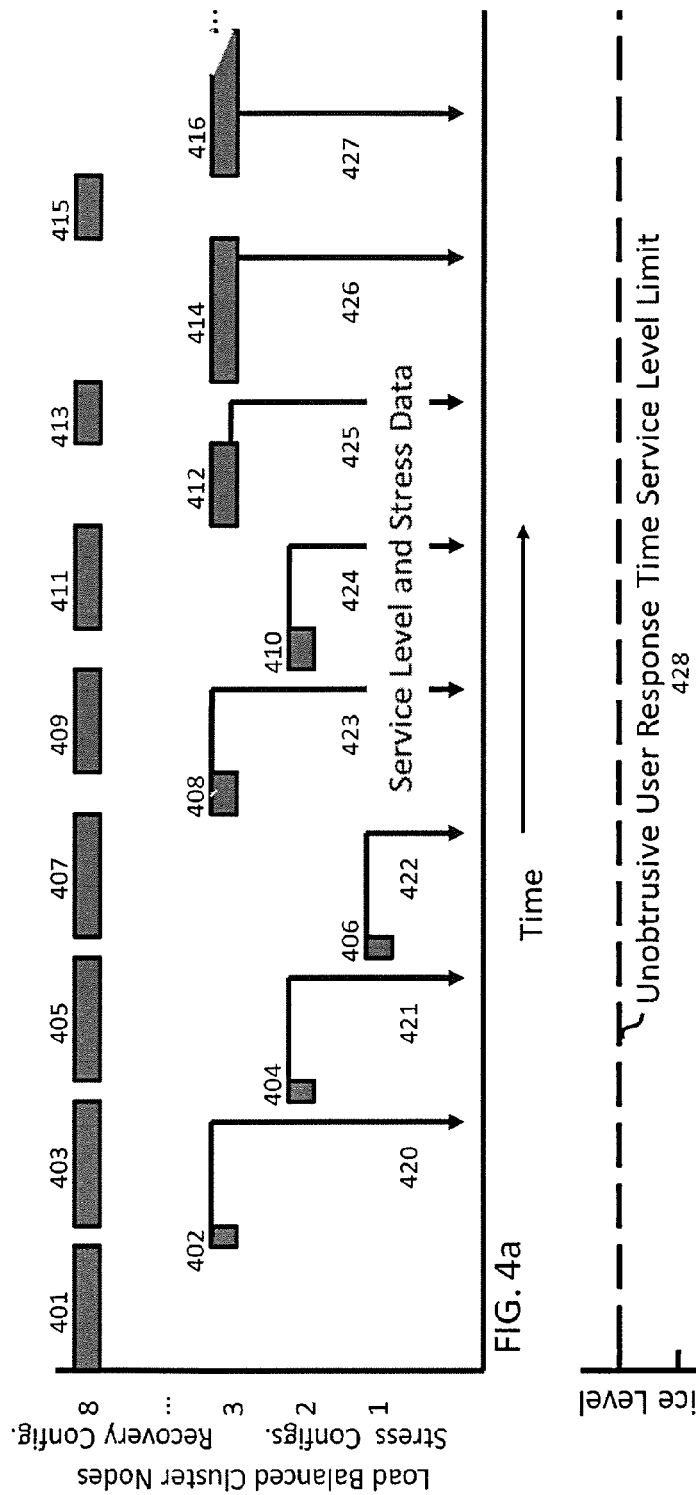
FIGS. 4A-4C illustrate transactional sequences of varying stress as applied to horizontally scaled software applications according to one embodiment of the invention.
Figure 4B:
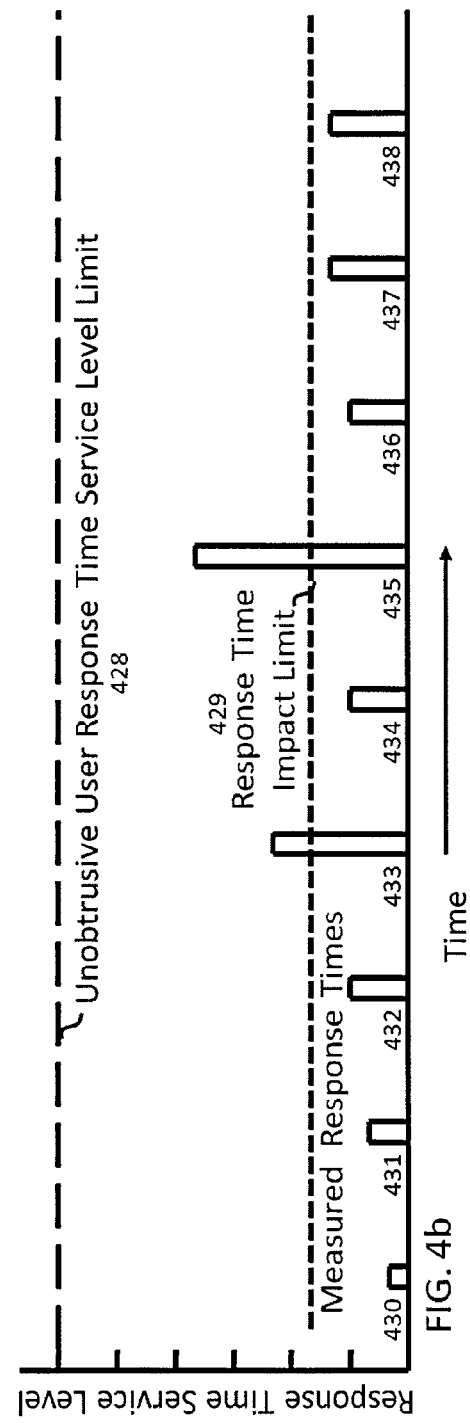
Figure 4C:
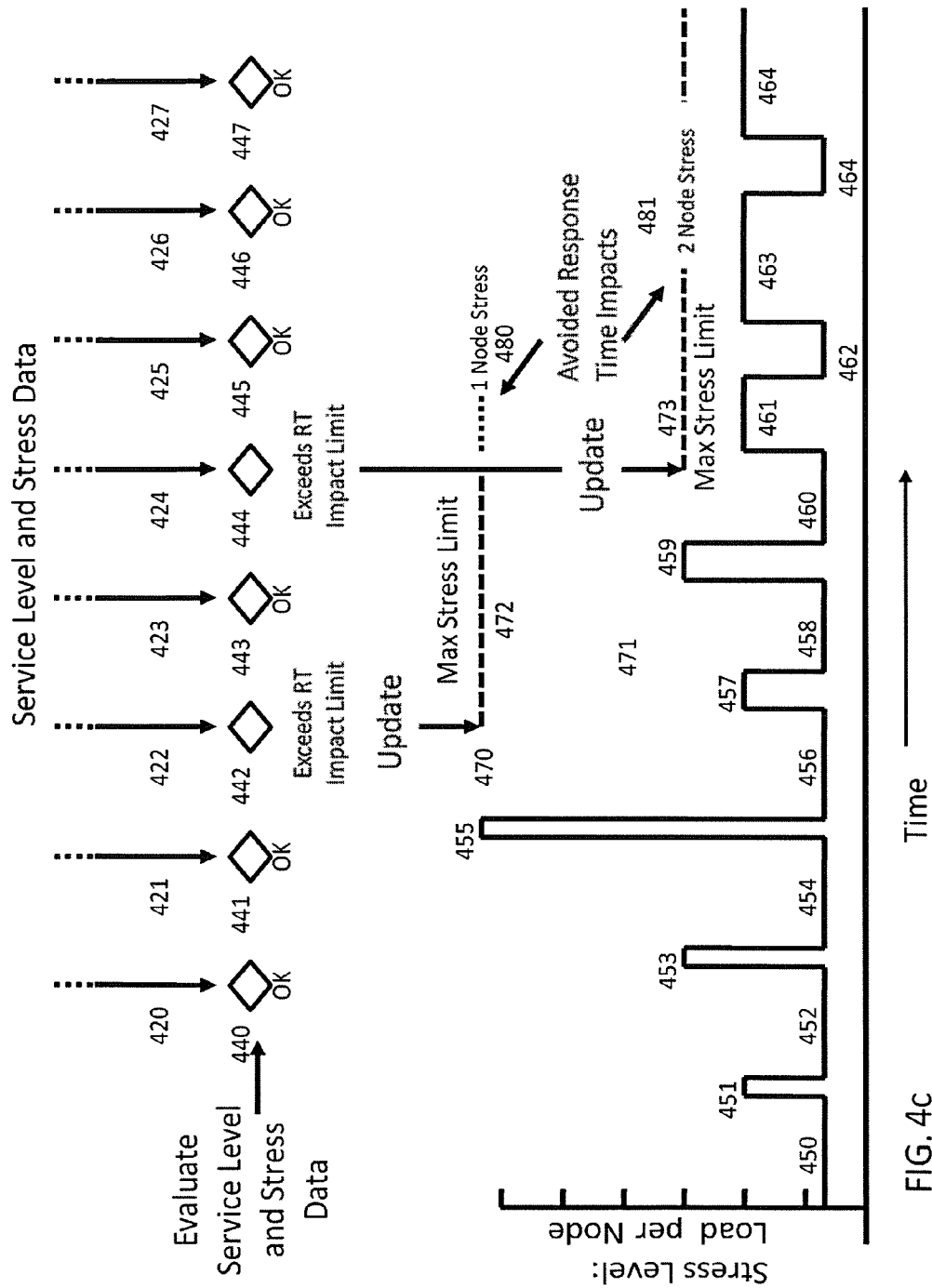

FIGS. 4A-4C illustrate transactional sequences of varying stress as applied to horizontally scaled software applications according to one embodiment of the invention. In one embodiment, transactional sequences of FIGS. 4A-4C may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, transactional sequences of FIGS. 4A-4C may be performed by the stress varying mechanism of FIG. 1. FIG. 4A illustrates a timeline of various sizes of clusters which equally share the workload. The illustrated embodiment starts with an eight node cluster size 401 which is regarded as the recovery configuration. FIG. 4C shows that in the eight node recovery configuration, the stress level 450 is relatively low as measured by a stress metric, such as load per node, which is the total load divided by the number of nodes receiving that load. The response time 430 at this low stress level is also low as shown in FIG. 4B.

The first change to a stress configuration is to the cluster with 3 nodes 402 in FIG. 4A, while the stress metric 451, as shown in FIG. 4C, increases with this stress configuration transition. FIG. 4A shows that the load is then switched back to the eight node recovery configuration 403, which causes a corresponding reduction in stress level 452 in FIG. 4C. The change to these eight nodes is made without waiting for the service level or stress data. The service level and stress data 420 (as in FIG. 4A) that includes the effects of the three node cluster stress 451 (as in FIG. 4C) is produced while the total workload is balanced across the full eight node recovery configuration. The next switch to a smaller cluster stress configuration is not made until the service level and stress data has been received and processed.

Service level and stress data from the three node stress configuration 420 indicates that response time 431 increases as a result of the increased stress as shown in FIG. 4B; however, even with this increase, the response time is smaller than the response time impact limit 429. The response time impact limit is used to define a relationship of response time to stress level, and this relationship is subsequently used to limit stress and avoid obtrusive degradation of user response time. In one embodiment, response time data associated with a full cluster size recovery configuration of a load-balanced software application is compared with response time data that occurs while the software application has been transitioned to a smaller cluster-sized stress configuration. In one embodiment, this comparison is used to dynamically determine the response time impact limit and further, such comparison may be used in conjunction with statistical machine learning to dynamically determine response time impact limits.

FIG. 4B shows that the response time impact limit 429 is lower than the unobtrusive user response time service level limit 428 such that stress can be created by reducing a cluster size while the effect on the relevant service levels is unobtrusive. In other words, the lower response time impact limit allows the stress varying mechanism to vary stress on the software application to cause an impact on response time such that it is not obtrusive to user service levels.

Since the response time from the three node cluster is less than the response time impact limit, the configuration is transitioned from the eight node recovery configuration to a two node stress cluster 404 (as in FIG. 4A) to induce a higher stress 453 (as in FIG. 4C) for the same time duration as the three node stress cluster used previously. The configuration is then restored to the eight node cluster recovery configuration 405. The two node size may be selected because it is the next highest stress level available using an equally balanced distribution of total workload. In one embodiment, commands may be sent to the load balancer to distribute load unequally across the nodes, having the effect of producing any one of a wide range of stress levels; for example, an unequal load distribution can increase the stress on a small subset of the cluster's nodes to further limit the number of requests which could have response time impacts and thus, further ensuring that the variation in stress is unobtrusive to users.

Service level data 421 (of FIG. 4A) from the two node cluster size stress configuration again shows a response time 432 less than the response time impact limit 429 (as in FIG. 4B). As a result, the configuration is next switched from the eight node recovery configuration to a one node cluster stress configuration 406 as in FIG. 4A. For the one node cluster, the service level data 422 shows a response time 433 greater than the response time impact limit 429 as in FIGS. 4A and 4B. This elevated response time is evaluated and it is determined that the stress level for one node 455 (as in FIG. 4C) is too high to maintain response times under the response time impact level which could risk causing an obtrusive impact on user service levels and therefore, the stress varying mechanism sets the maximum stress limit 472 to the one node stress level 455. The maximum stress limit is used subsequently to avoid stress configurations which could cause response time degradation and potentially obtrusive impacts on user service levels.

The next stress configuration is the three node configuration. For this stress configuration 408, the time duration of the stress is increased from the previous duration. The stress varying mechanism may determine limitations on the increase to limit the potential impact on response times and thus, continuing its unobtrusive operation. Every time a stress configuration is unobtrusively completed for a given time duration, the uncertainty or risk associated with applying the same stress condition for a longer time duration is reduced.

Several cycles later, a switch to the two node cluster 410 at the longer time duration has been completed. Before proceeding to the one node stress configuration, the method predicts the stress level 480 for the potential transition. The stress varying mechanism finds this stress level to be equal to or greater than the currently determined maximum stress limit 472 as in FIG. 4C. This condition has a risk of significant response time degradation and the one node stress configuration is omitted from the series of stress configuration transitions. Thus, the stress varying mechanism can adaptively learn and predict when response times may be impacted and avoid the corresponding stress configurations.

The aforementioned process of reducing cluster size and increasing duration of the reductions may be repeated continuously. This way, the stress varying mechanism varies stress configurations and resulting stress on the software application while unobtrusively affecting service levels. This varying of stress continues to transition to stress configurations and further, varying and increasing stress levels, until there are no breaches of the response time impact limit at longer durations of increased stress. At this point, data is collected on software application behavior at varying stress levels for significant lengths of time. Having created these variations in stress, the stress varying mechanism terminates further variations.

Figure 5:
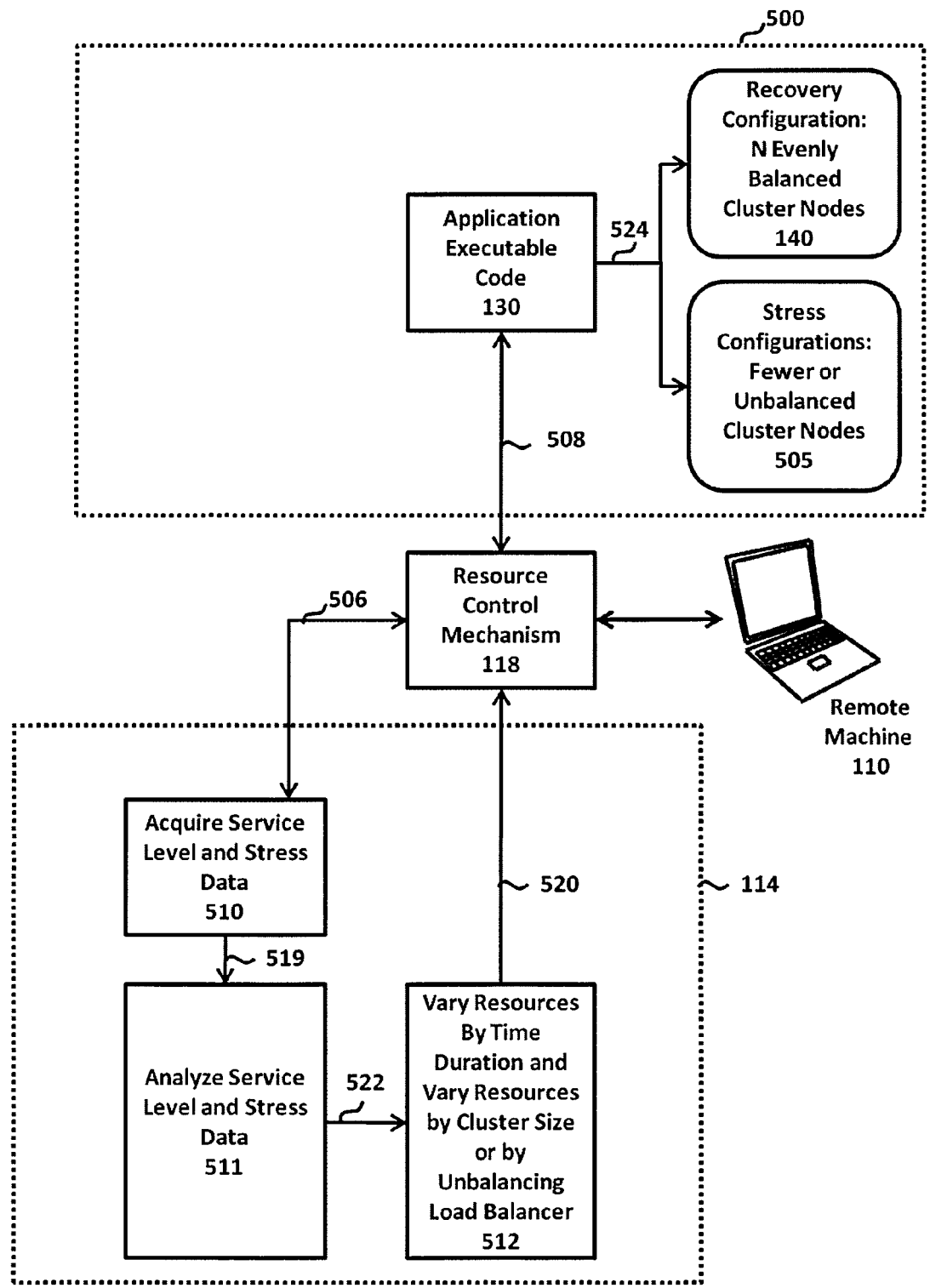
FIG. 5 illustrates functional components of a stress varying mechanism as applied to a horizontally scaled software application according to one embodiment of the invention.

FIG. 5 illustrates functional components of stress varying mechanism as applied to a horizontally scaled software application according to one embodiment of the invention. In one embodiment, stress varying mechanism 114 interacts with a software application 500 via a resource control mechanism 118 which serves as a cluster load balancer. Stress varying mechanism 114, in one embodiment, is used to vary stress on a software application 500 by approaching the software application's stress limits. In the illustrated embodiment, the resource control mechanism 118 accepts a software application workload 500 and distributes it to the software application's executable code 502 (such as software application instances 130, 132, 134 of FIG. 1) and uses the application resources configured as cluster recovery and stress configurations 140 and 505 respectively. In one embodiment, this either changes the configuration of the cluster by changing the effective size of the cluster or the relative proportion of service requests directed to each node in the cluster.

In one embodiment, the stress varying mechanism 114 performs the following: (a) functional component 512 varies resources by time duration and varies resources by cluster size or by unbalancing resource control mechanism 118 serving as a load balancer to vary the allocation of resources from a recovery configuration 140 to a stress configuration 505 for a variable length of time, switches the allocation back to the recovery configuration 140 without waiting to acquire service level data, and maintains the resource allocation in the recovery configuration 140 until service level assurance and stress condition data becomes become available, (b) functional component 510 acquires service level and stress data, (c) functional component 511 analyzes service level assurance and stress data to determine future transitions to stress configurations 505 and time durations in the stress configuration 505 before returning to the recovery configuration 140, where the time durations in the stress configuration may be determined to be variable, (d) repeat a), b), and c) multiple times, and (e) repeat d) one or more times continuously.

In one embodiment, the number of cluster nodes N (recovery configuration 140) is reduced to a smaller number of cluster nodes (stress configuration 505) for a limited time duration or the distribution of load from the resource control mechanism 118 serving as a load balancer is temporarily changed from evenly balanced over N nodes (recovery configuration 140) to an uneven distribution of load that stresses a particular node (stress configuration 505) for a limited time duration. Further, in one embodiment, stress configuration 505 is controlled by successively increasing the time duration of the stress configuration 505 and for each time duration either reducing the number of nodes or increasing the load directed to a particular node. In this embodiment, future changing of stress configuration 505 is managed by 1) determining a stress level metric for previous and future stress configurations 505, 2) determining if previous stress configurations 505 impacted service levels and, if said impact exists, then determining a maximum stress limit; and 3) avoiding future stress configurations 505 if the stress level of said stress configurations 505 is expected to exceed the maximum stress limit. The maximum stress limit is chosen to ensure any effect on response time service levels remains unobtrusive. When a stress configuration 505 is unobtrusively applied to the software application for a given time duration, the uncertainty associated with applying the same stress configuration 505 for a longer time duration is reduced. When the maximum stress limit has not changed for a predetermined number of successively increasing time durations, the stress varying mechanism 114 stops controlling the stress on the cluster and returns the cluster size to the full number of nodes in the recovery configuration 140.

FIGS. 6A-6J illustrate methods for varying stress as applied to a horizontally scaled software application according to one embodiment of the invention. In one embodiment, methods 600-690 of FIGS. 6A-6J may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, methods 600-690 of FIGS. 6A-6J may be performed by the stress varying mechanism of FIG. 1. The illustrated embodiments describe an experiment comprising 1) a transition to a stress configuration, 2) maintaining the stress configuration for a duration of time, and 3) transitioning back to the recovery configuration. In method 600 (FIG. 6A), block 601 declares and initializes variables used by the embodiment. Block 602 calls the vary_experiment_duration processes as defined in method 610 of FIG. 6B. Method 600 of FIG. 6A may be executed one or more times continuously.

Figure 6A:
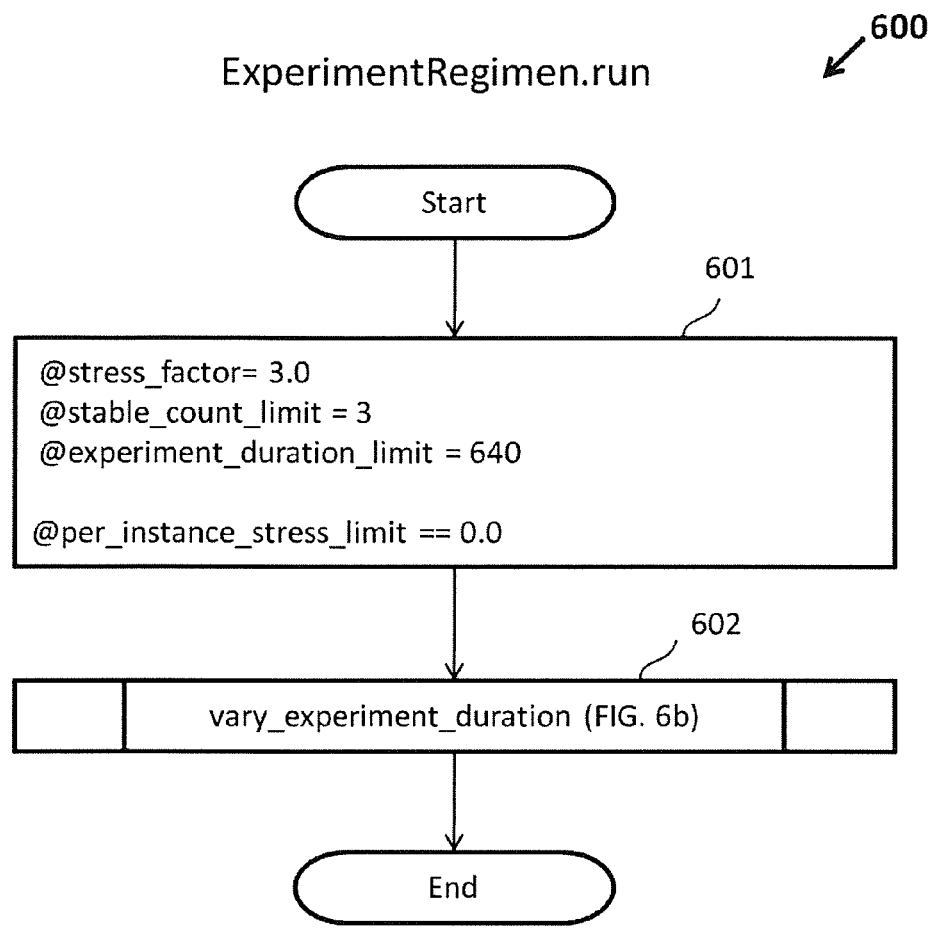
FIGS. 6A-6J illustrate methods for varying stress as applied to a horizontally scaled software application according to one embodiment of the invention.
Figure 6B:
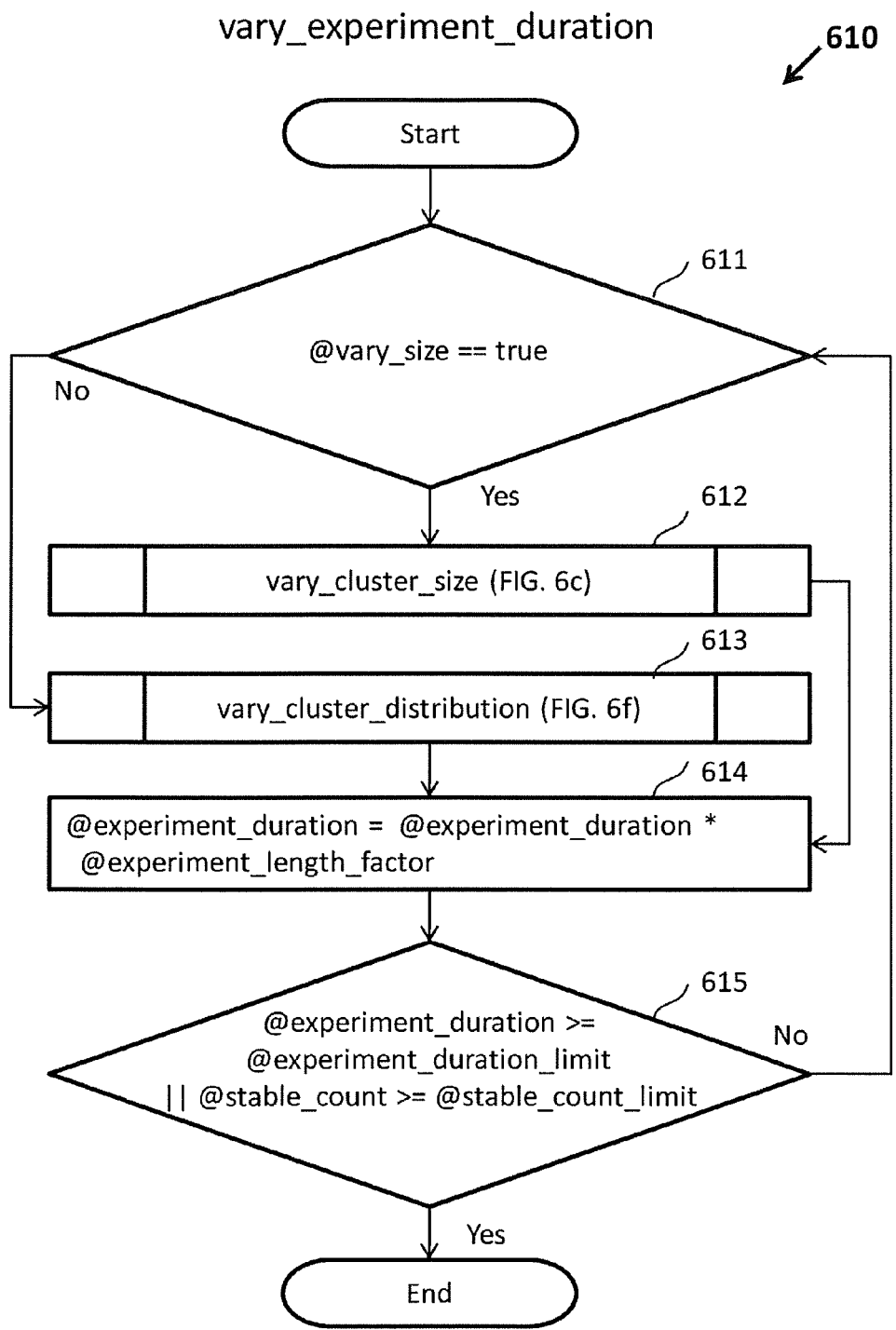

Vary_experiment_duration processes described in FIG. 6B vary the experiment duration time by increasing the duration of subsequent experiments until the condition in block 615 is met. For the duration of each specific experiment, cluster load balancing is varied by testing in block 611 whether variable @vary_size has been previously defined to be true. When variable @vary_size is true vary_experiment_duration processes vary the size of the cluster by executing vary_cluster_size processes as described in method 620 of FIG. 6C. When @vary_size is false then these process vary a proportion of the total workload directed to a specific node in the cluster by executing vary_cluster_distribution processes as described in method 650 of FIG. 6F. After the cluster load balancing is varied by either block 612 or block 613 the duration of the next set of experiments is increased in block 614 by multiplying the current experiment duration by a predefined factor. Finally, block 615 terminates the experiments when either a predefined maximum time limit has been exceeded or when the per instance stress limit has remained unchanged (stable) for a predefined number of experiment duration values.

Figure 6C:
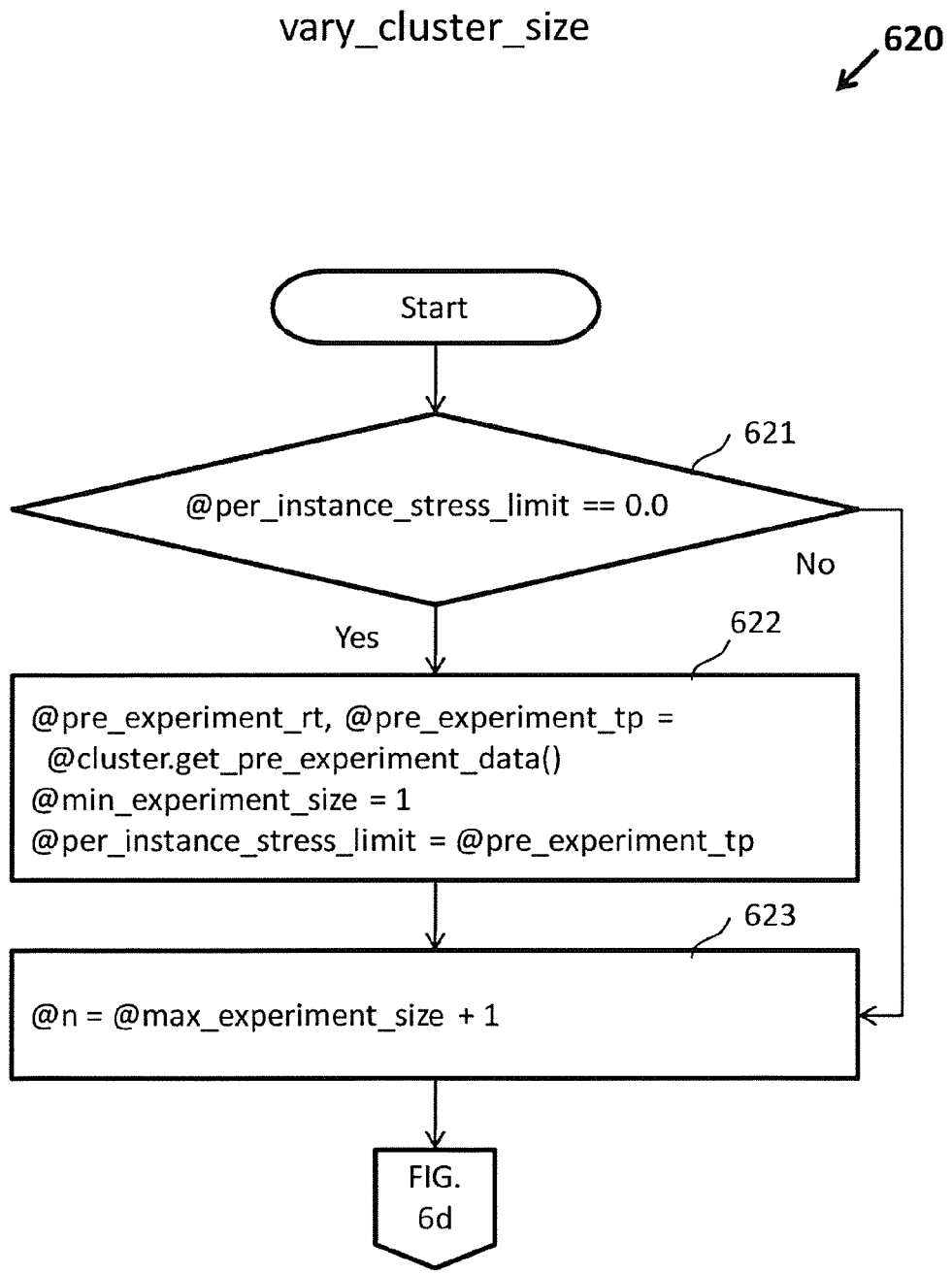
Figure 6D:
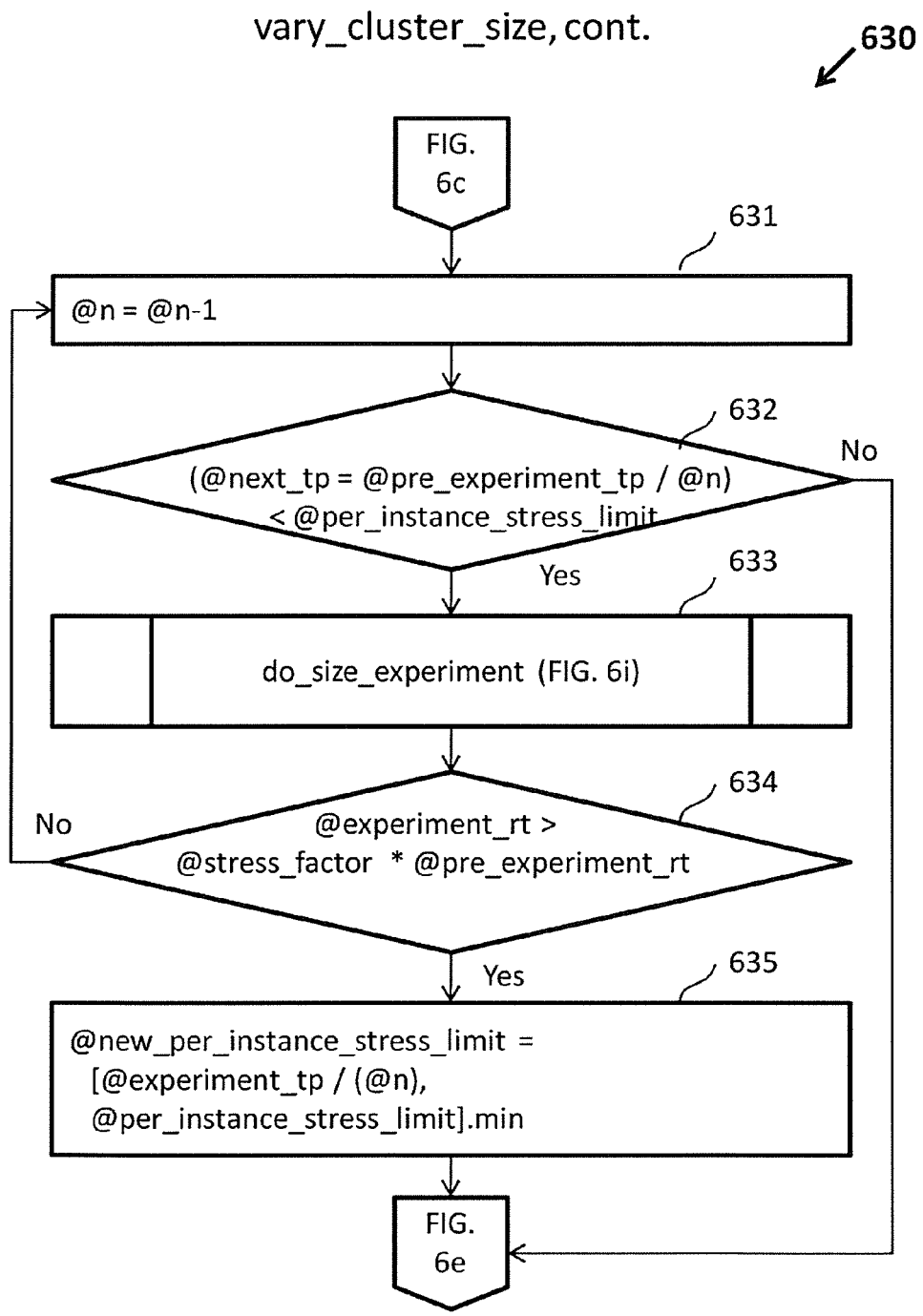
Figure 6E:
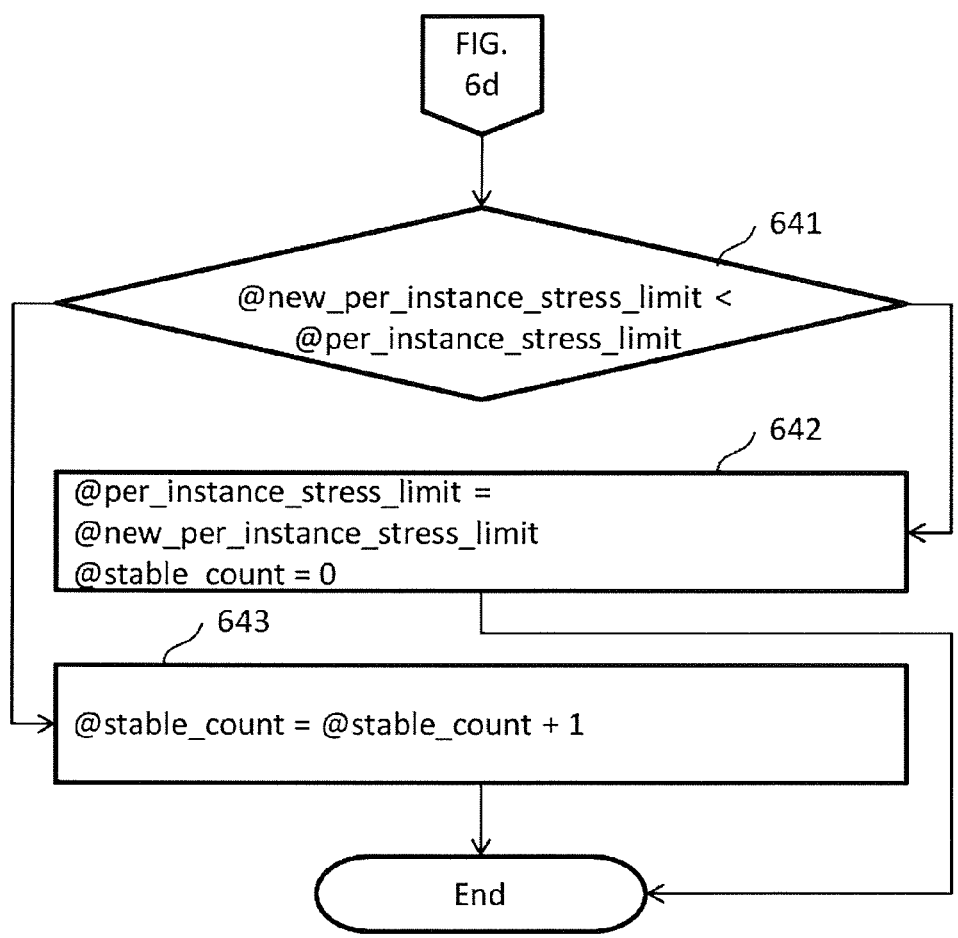

Vary_cluster_size processes described in methods 620 thru 640 of FIGS. 6C thru 6E vary the size of a load balanced cluster by adding and removing nodes from the cluster for the current experiment. Block 621 in FIG. 6C tests whether the per_instance_stress_limit variable has previously been set. If per_instance_stress_limit has not been set, then variables in block 622 are initialized. Block 623 initializes @n which is the initial size of the cluster for this set of experiments. Once the variables are initialized, blocks 631 thru 634 in FIG. 6D describe a loop which varies the cluster size (@n) by decrementing it until the condition in block 634 is true. The loop may be exited prematurely from block 632 if the next cluster size decrement will result in a cluster node throughput (stress metric) which exceeds the current value of the cluster node per instance stress limit. Block 633 executes the do_size_experiment processes described in FIG. 6I for each reduced cluster size. Block 634 causes the cluster size to be reduced until the response time recorded during the experiment exceeds a predefined proportion of the recovery configuration response time. If the response time exceeds a predefined proportion of the recovery configuration response time then a new per instance stress limit is defined in block 635. Finally, in FIG. 6E blocks 641 through 643 test whether a new per instance stress limit was defined in the loop executed in blocks 631 through 634. If a new per instance stress limit was defined then the stable count variable is reset to zero in block 642, otherwise it is incremented in block 643 and later tested in block 615 in FIG. 6B. Updating the per instance stress limit reduces the uncertainty about the obtrusiveness associated with a future selection of specific stress configuration for a longer time duration.

Figure 6F:
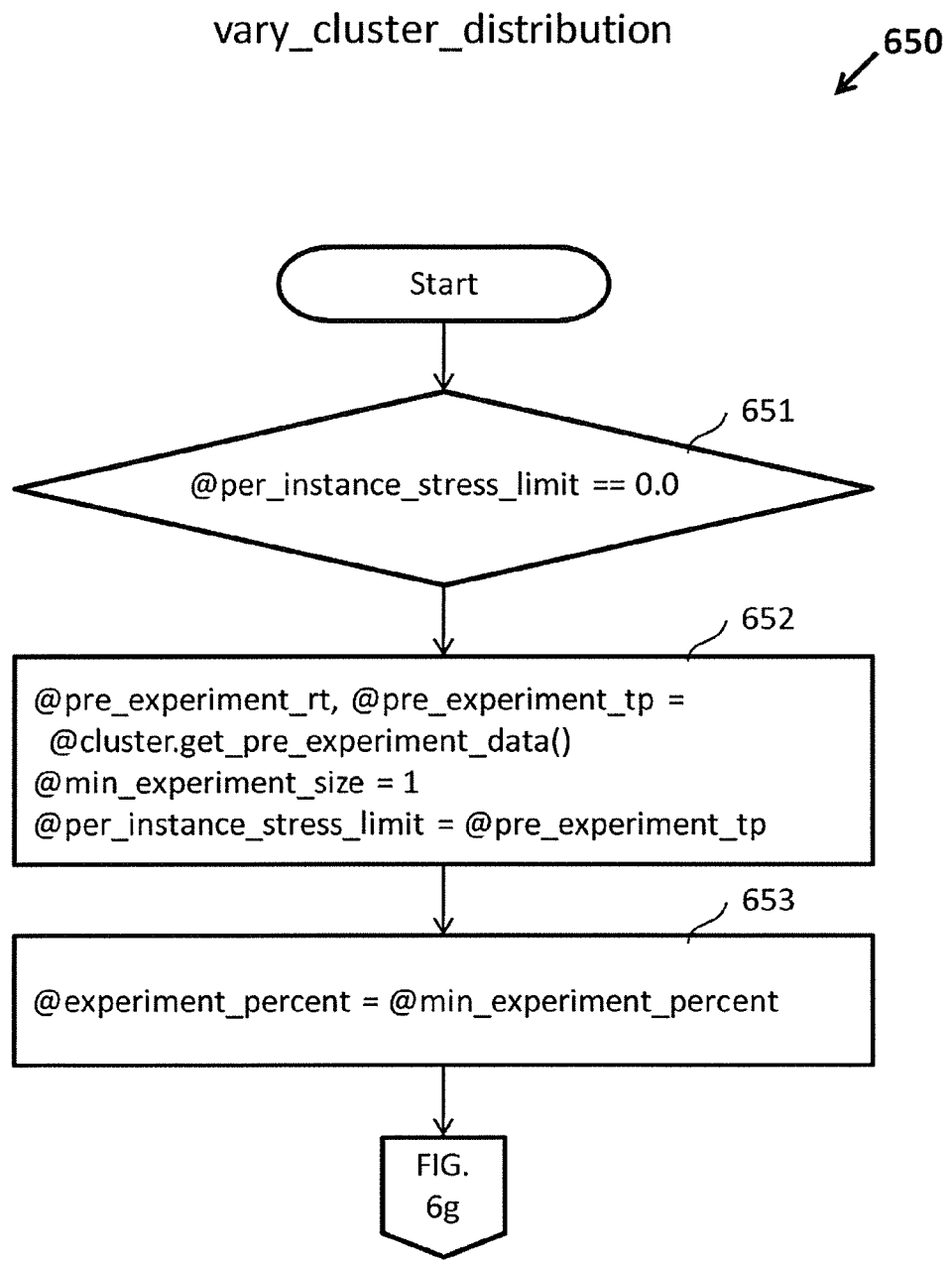
Figure 6G:
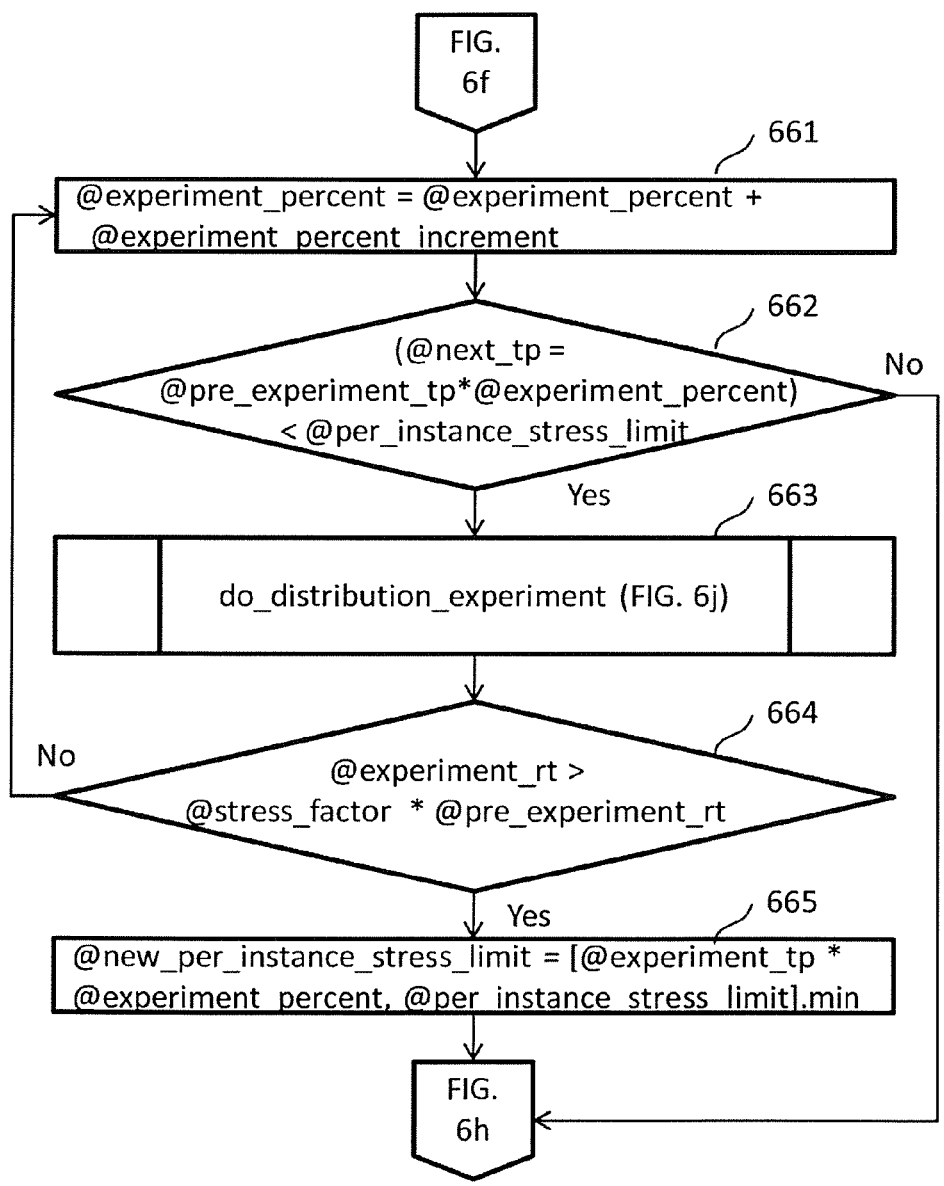
Figure 6H:
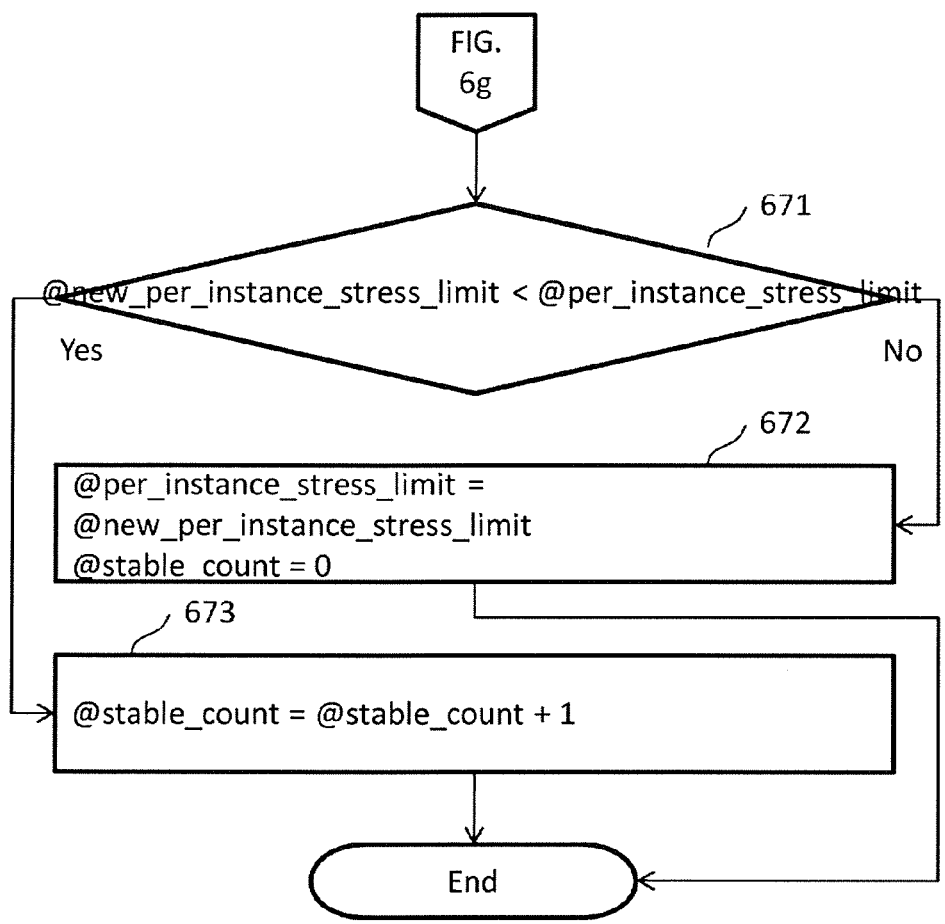

Vary_cluster_distribution steps described in method 650 thru 670 of FIG. 6F thru 6H vary the proportion of the total workload directed to a specific node in the cluster for the current experiment time duration. Block 651 in FIG. 6F tests whether the per_instance_stress_limit variable has previously been set. If per_instance_stress_limit has not been set, then variables in block 652 are initialized. Block 653 initializes the percentage of the total workload that will be directed to a specific node in the cluster. Once the variables are initialized, blocks 661 through 664 in method 660 of FIG. 6G describe a loop which varies the percentage of the total workload that will be directed to a specific node in the cluster by incrementing the percentage until the condition in block 664 is true. The loop may be exited prematurely from block 662 if the percentage increment will result in a cluster node throughput (stress metric) which exceeds the current value of the cluster node per instance stress limit. Block 663 executes the do_distribution_experiment steps described in FIG. 6J. For each percentage increment the workload directed to a specific node is increased. Block 664 causes the cluster percentage directed to a specific node to be increased by block 661 until the response time recorded during the experiment exceeds a predefined proportion of the full cluster response time. If the response time exceeds a predefined proportion of the recovery configuration response time then a new per instance stress limit is defined in block 665. Finally, in FIG. 6H blocks 671 thru 673 test whether a new per instance stress limit was defined in the loop executed in blocks 661 thru 664. If a new per instance stress limit was defined then the stable count variable is reset to zero in block 672, otherwise it is incremented in block 673 and later tested in block 615 in FIG. 6B. Updating the per instance stress limit reduces the uncertainty about the obtrusiveness associated with a future selection of specific stress configuration for a longer time duration.

Figure 6I:
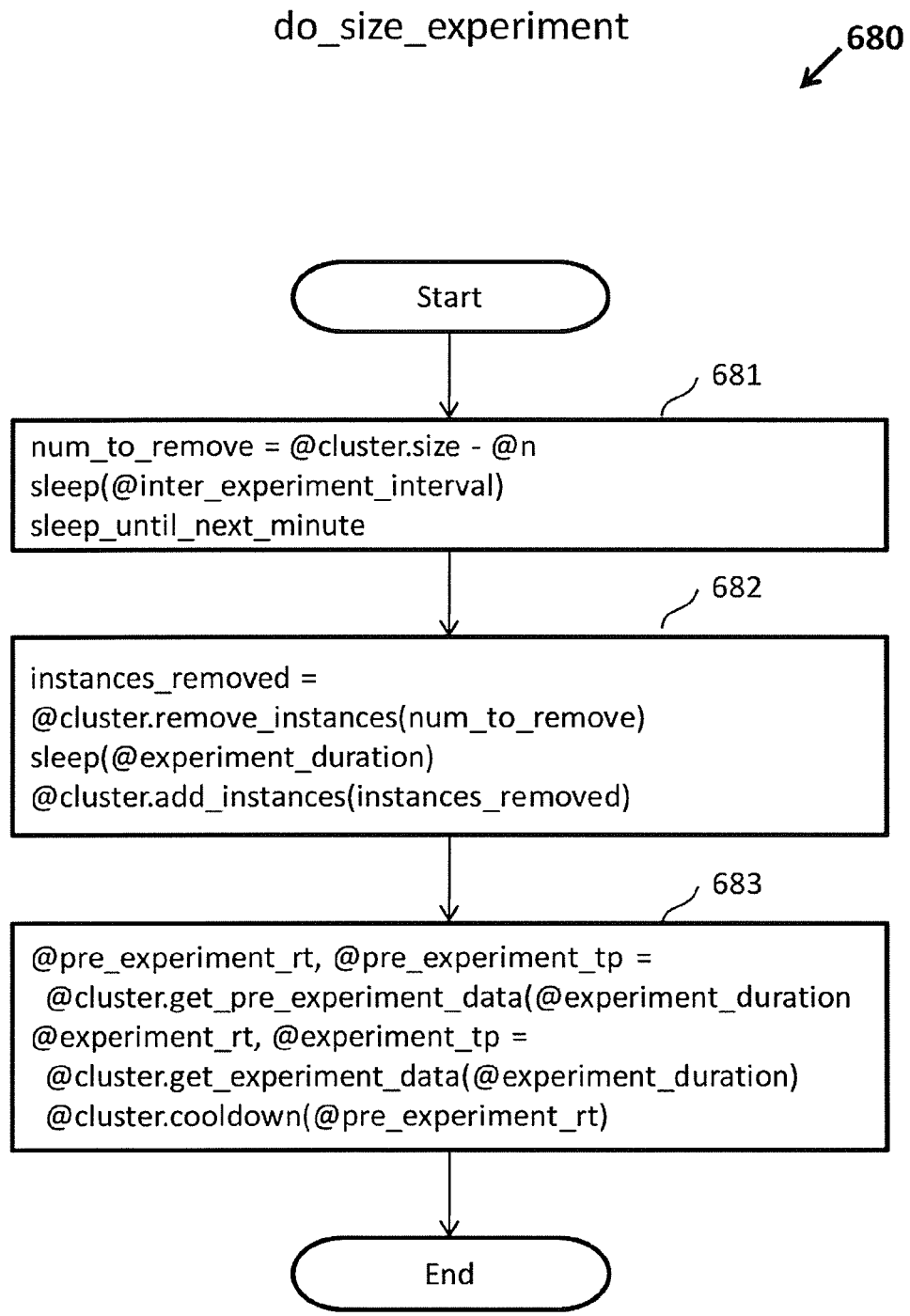

FIG. 6I's method 680 describes do_size_experiment processes. These processes interact with a cluster load balancer to remove a specified number of nodes from the cluster for the experiment time duration defined in block 614 of FIG. 6B. Block 681 calculates the number of nodes to remove from the cluster and also sleeps for a specified amount of time between experiments. Block 681 also synchronizes the experiment to begin at or slightly after the start of the next minute. Block 682 reduces nodes from the cluster, sleeps for the current experiment time duration, and adds the removed nodes back to the cluster. Block 683 gets service level data for the time periods before and during the experiment. Since block 683 executes after block 682 the next experiment will not run until service level assurance data is received from the preceding experiment.

Figure 6J:
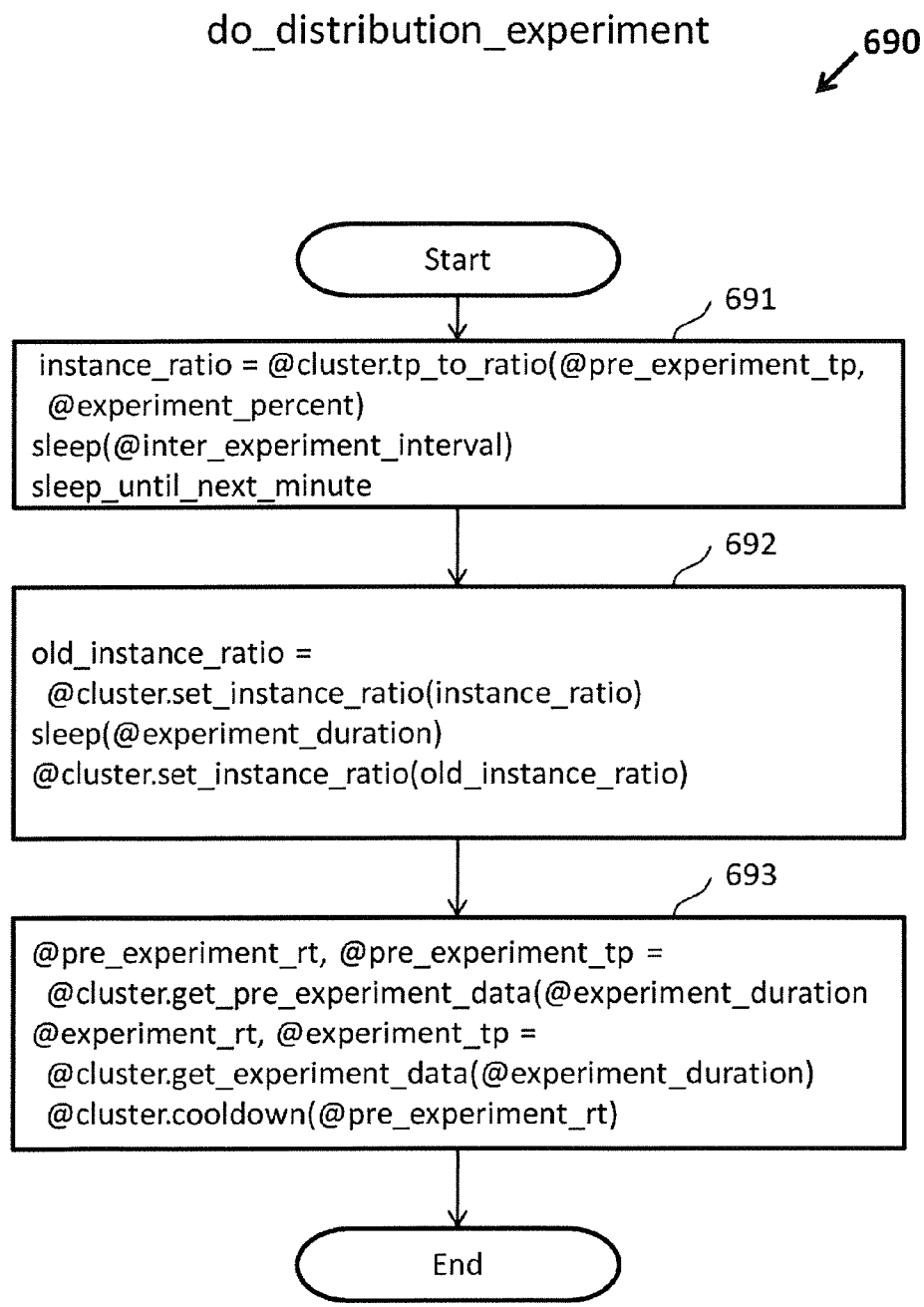

FIG. 6J's method 690 describes do_distribution_experiment processes. These processes interact with a cluster load balancer to vary the proportion of the total workload directed to a specific node in the cluster for the experiment time duration defined in block 614 of FIG. 6B. Block 691 calculates the ratio of the workload directed to the specific node to the total workload directed to the entire cluster. Block 691 also synchronizes the experiment to begin at or slightly after the start of the next minute. Block 692 sets the ratio of the total workload directed to the specific cluster node, sleeps for the current experiment time duration, and restores the load balancer to the recovery configuration. Block 693 gets service level data for the time periods before and during the experiment. Since block 693 executes after block 692 the next experiment will not run until service level assurance data is received from the preceding experiment.

Figure 7:
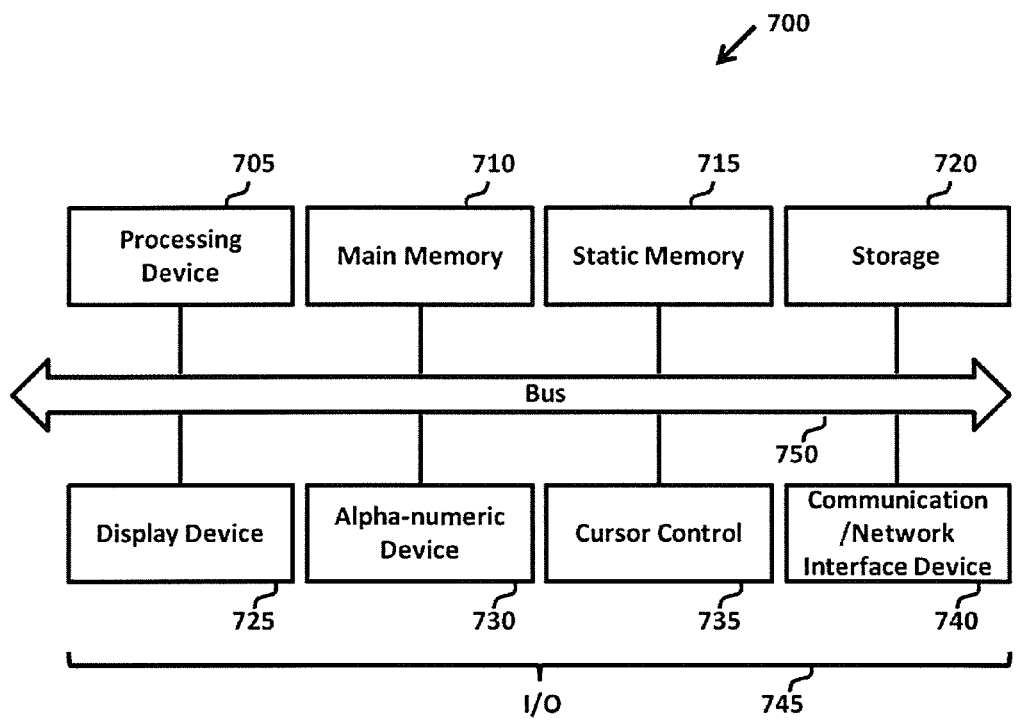
FIG. 7 illustrates one embodiment of a computer system.

FIG. 7 illustrates a computer system for employing a stress varying mechanism according of FIG. 1 to one embodiment of the invention. Computer system or machine 700 may include and function in a server or client computer system capacity in, for example, a server-client environment. Computer system 700 may be a personal computer (PC), a Personal Digital Assistant (PDA), a computer pad or tablet, a smart mobile phone, a web server, or any data processing machine capable of storing and executing instructions to perform various tasks (including the ones performed by the stress varying mechanism of FIG. 1) mentioned throughout this document. Although the computer system 700 shown as a single machine, it is contemplated that the term "machine", as referred to in this documents, may include any number of machines in communication with each other or other remote machines. Computer system 700 may be in communication with other machines over a network (e.g., local area network (LAN), wide area network (WAN), metropolitan area network (MAN), intranet, the Internet, etc.) as connected or networked through a communication/network interface device 740 (e.g., network interface card, modem, other devices such as to connect to Ethernet, token ring, etc.). Further, computer system 700 may be accessed or communicated with using various other input/output (I/O) devices 745, such as an input device, such as an alpha-numeric device 730 (e.g., keyboard) and/or a cursor control device 735 (e.g., mouse), and a display device 725 (e.g., a video display device, such as a liquid crystal display (LCD), a cathode ray tube (CRT), etc.) and other similar devices, such as speakers, etc., connected through a graphics port or chipset.

Computer system 700 includes a processing device 705. Processing device 705 represents one or more general-purpose processing devices (such as a microprocessor, central processing unit, etc.) and more particularly, the processing device may be complex instruction set computing (CISC) microprocessor, reduced instruction set computer (RISC) microprocessor, very long instruction word (VLIW) microprocessor, or a processing device implementing other instruction sets or a combination of instruction sets. Processing device 705 may also be one or more special-purpose processing devices (e.g., application specific integrated circuit (ASIC), a field programmable gate array (FPGA), a digital signal processor (DSP), network processor, etc.). In one embodiment, processing device 705 is configured to execute the processing logic for performing the operations and methods discussed herein and as performed by the stress varying mechanism.

Computer system 700 further includes a main memory 710 (e.g., read-only memory (ROM), flash memory, random access memory (RAM), dynamic RAM (DRAM), synchronous DRAM (SDRAM), etc.), a static memory 715 (e.g., flash memory, static random access memory (SRAM), etc.), and other storage 720 (e.g., a data storage device or a magnetic disk or optical disc in the form of a drive unit, which may include fixed or removable machine-accessible or computer-readable storage medium), which communicate with each other via a bus 750. Storage 720 may include a machine-accessible storage medium that may then be used to store one or more sets of instructions (e.g., stress varying mechanism instructions). The stress varying mechanism instructions may be transmitted or received over a network via the network interface device 740. The stress varying mechanism of FIG. 1 may also reside, completely or at least partially, within the main memory 710 and/or within the processing device 705 (e.g., stress varying mechanism processing logic) during execution thereof by the computer system 700, the main memory 710 and the processing device 705 also constituting machine-readable storage media. Further, in one embodiment, the stress varying mechanism may be employed (entirely) on a single machine, such as computer system 700, or (partially or entirely) on different computer systems.

While the machine-accessible storage medium is described as a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

As aforementioned, in one embodiment, the stress varying mechanism is represented as and includes modules, components and other features, as described throughout this document, can be implemented as discrete hardware components or integrated in the functionality of hardware components such as Application-Specific Integrated Circuit (ASIC), Field-Programmable Gate Array (FPGA), Digital Signal Processor (DSP), etc., or as software or as firmware or functional circuitry.

Throughout the foregoing description, for the purposes of explanation, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. An algorithm is here, and generally, conceived to be a self-consistent sequence of processes or steps leading to a desired result, and these processes or steps are those requiring physical manipulations of physical quantities manifesting as electrical or magnetic signals (e.g., bits, values, elements, symbols, characters, terms, numbers, etc.) capable of being stored, transferred, combined, compared, and otherwise manipulated. Further, terms (such as "configure", "determine", "acquire", etc.) may be associated with various physical quantities and refer to action or processes or steps of processing logic of a processing device, such as the processing device 705, of a data processing device, such as the computer system 700. It is contemplated that apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus. However, it is further contemplated that methods (e.g., algorithms, processes, steps, etc.) and displays presented herein are not inherently related to any particular computer system or apparatus. Various general purpose systems may be used with programs in accordance with the teachings herein, or it may prove convenient to construct more specialized apparatus to perform the required method steps. Moreover, the present invention is not described with reference to any particular programming language or operating system or software platform. For example, it is appreciated that a variety of programming languages may be used to implement the teachings of the invention as described herein.

As aforementioned, embodiments of the present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., computer system 700). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "X" is coupled to or with element "Y," element X may be directly coupled to element Y or be indirectly coupled through, for example, element "Z". When the specification or claims state that a component, feature, structure, process, or characteristic X "causes" a component, feature, structure, process, or characteristic Y, it means that "X" is at least a partial cause of "Y" but that there may also be at least one other component, feature, structure, process, or characteristic that assists in causing "Y." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements. Further, an embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
    continuously, actively and unobtrusively varying stress on a software application running on a computer system while processing, via a processor of the computer system, real user workloads, wherein continuously and unobtrusively varying stress includes:
        configuring application resources for a recovery configuration whose service levels are satisfactory, wherein the application resources are associated with the software application;
        configuring the application resources for stress configurations to affect the service levels;
        transitioning the application resources from the recovery configuration to a stress configuration for a time duration, wherein the application resources of the stress configuration are transitioned back to the recovery configuration;
        acquiring service level and stress data for the stress configuration where the latency to acquire the data when used as the time duration of the stress configuration causes unsatisfactory service levels;
        determining a combination of a next stress configuration and the time duration to vary stress such that user service levels are unobtrusively affected by limiting the time duration in inverse relation to an uncertainty in predicting the service level impact of the stress configuration; and
    determining a stress level metric for the stress configuration, wherein the stress level metric comprises a load per a resource which is one of calculated as a total workload divided by a number of resources or calculated as the workload on a specific resource which receives a variable fraction of the total workload, and wherein the maximum stress limit is calculated as a lower of a currently defined maximum stress limit and the stress level metric determined when service levels impact a response time service impact limit.

2. The computer-implemented method of claim 1, wherein the configuring of the application resources for the recovery and stress configurations includes allocating one or more application resources to a horizontally scalable software application as nodes in a multi-node cluster whose load is evenly balanced.

3. The computer-implemented method of claim 2, wherein:
    the recovery configuration includes a cluster having a largest number of nodes;
    the stress configurations include clusters, each cluster having a smaller number of nodes;
    the time duration includes a time duration during which each stress configuration increases; and
    for each time duration, an order of varying the stress configurations is in decreasing order of a given number of nodes in each corresponding stress configuration.

4. The computer-implemented method of claim 2, wherein:
    the recovery configuration includes a cluster having the largest number of nodes where a total workload is evenly distributed across the nodes;
    the stress configuration includes one node receiving a variable fraction of the total workload and remaining nodes receiving a remainder of the total workload are equally weighted;
    the time duration in the stress configuration increases; and
    for each stress configuration time duration, the fraction of the total workload received by the stress configuration increases.

5. The computer-implemented method of claim 1, further comprising:
    determining if a previous stress configuration impacted service levels and, if said impact exists, then determine a maximum stress limit;
    avoiding the stress configuration if a stress level metric of the stress configuration exceeds the maximum stress limit; and
    increasing a time duration of stress configurations whose stress level remains below the maximum stress limit.

6. The computer-implemented method of claim 5, wherein the service levels comprise response times, wherein whether there was an impact to the service levels is determined by comparing the response times to a response time impact limit, wherein the response time impact limit includes response time data obtained while the software application was in the recovery configuration.

7. The method of claim 1, further comprising: determining the maximum stress limit if the service level during a stress configuration indicates degradation sufficiently large enough that if selected again for a longer time period, the maximum stress limit fails to have an unobtrusive effect on service levels.

8. A system comprising:
    a computing device having a memory to store instructions relating to a mechanism, and a processing device to execute the instructions such that the mechanism performs one or more operations, wherein the mechanism is operable to:
        configure application resources for a recovery configuration whose service levels are satisfactory;
        configure the application resources for stress configurations to affect service levels;
        transition the application resources from the recovery configuration to a stress configuration for a time duration, wherein the application resources of the stress configuration are transitioned back to the recovery configuration;
        acquiring service level and stress data for the stress configuration where the latency to acquire the data when used as the time duration of the stress configuration causes unsatisfactory service levels;
        determine a combination of a next stress configuration and the time duration to vary stress such that user service levels are unobtrusively affected by limiting the time duration in inverse relation to an uncertainty in predicting the service level impact of the stress configuration; and
        determining a stress level metric for the stress configuration, wherein the stress level metric comprises a load per a resource which is one of calculated as a total workload divided by a number of resources or calculated as the workload on a specific resource which receives a variable fraction of the total workload, and wherein the maximum stress limit is calculated as a lower of a currently defined maximum stress limit and the stress level metric determined when service levels impact a response time service impact limit.

9. The system of claim 8, wherein the configuring of the application resources for the recovery and stress configurations includes allocating one or more application resources to a horizontally scalable software application as nodes in a multi-node cluster whose load is evenly balanced.

10. The system of claim 9, wherein:
the recovery configuration includes a cluster having the largest number of nodes;
the stress configurations include clusters, each cluster having a smaller number of nodes;
the time duration includes a time duration during which each stress configuration increases; and
for each time duration, an order of varying the stress configurations is in decreasing order of a given number of nodes in each corresponding stress configuration.

11. The system of claim 9, wherein:
the recovery configuration includes a cluster having a largest number of nodes where a total workload is evenly distributed across the nodes;
the stress configuration includes one node receiving a variable fraction of the total workload and remaining nodes receiving a remainder of the total workload are equally weighted;
the time duration in the stress configuration increases; and
for each stress configuration time duration, the fraction of the total workload received by the stress configuration increases.

12. The system of claim 8, wherein the mechanism is further operable to:
determine if a previous stress configuration impacted service levels and, if said impact exists, then determine a maximum stress limit;
avoid the stress configuration if a stress level metric of the stress configuration exceeds the maximum stress limit; and
increase a time duration of stress configurations whose stress level remains below the maximum stress limit.

13. The system of claim 12, wherein the service levels comprise response times, wherein whether there was an impact to the service levels is determined by comparing the response times to a response time impact limit, wherein the response time impact limit includes response time data obtained while the software application was in the recovery configuration.

14. The system of claim 8, wherein the mechanism is further operable to: determine the maximum stress limit if the service level during a stress configuration indicates degradation sufficiently large enough that if selected again for a longer time period, the maximum stress limit fails to have an unobtrusive effect on service levels.

15. A non-transitory machine-readable storage medium including data that, when accessed by a machine, cause the machine to perform operations comprising:
configuring application resources for a recovery configuration whose service levels are satisfactory;
configuring the application resources for stress configurations to affect service levels;
transitioning the application resources from the recovery configuration to a stress configuration for a time duration, wherein the application resources of the stress configuration are transitioned back to the recovery configuration;
acquiring service level and stress data for the stress configuration where the latency to acquire the data when used as the time duration of the stress configuration causes unsatisfactory service levels;
determining a combination of a next stress configuration and the time duration to vary stress such that user service levels are unobtrusively affected by limiting the time duration in inverse relation to an uncertainty in predicting the service level impact of the stress configuration; and
determining a stress level metric for the stress configuration, wherein the stress level metric comprises a load per a resource which is one of calculated as a total workload divided by a number of resources or calculated as the workload on a specific resource which receives a variable fraction of the total workload, and wherein the maximum stress limit is calculated as a lower of a currently defined maximum stress limit and the stress level metric determined when service levels impact a response time service impact limit.

16. The article of manufacture of claim 15, wherein the configuring of the application resources for the recovery and stress configurations includes allocating one or more application resources to a horizontally scalable software application as nodes in a multi-node cluster whose load is evenly balanced.

17. The article of manufacture of claim 16, wherein:
the recovery configuration includes a cluster having the largest number of nodes;
the stress configurations include clusters, each cluster having a smaller number of nodes;
the time duration includes a time duration during which each stress configuration increases; and
for each time duration, an order of varying the stress configurations is in decreasing order of a given number of nodes in each corresponding stress configuration.

18. The article of manufacture of claim 16, wherein:
the recovery configuration includes a cluster having a largest number of nodes where a total workload is evenly distributed across the nodes;
the stress configuration includes one node receiving a variable fraction of the total workload and remaining nodes receiving a remainder of the total workload are equally weighted;
the time duration in the stress configuration increases; and
for each stress configuration time duration, the fraction of the total workload received by the stress configuration increases.

19. The non-transitory machine-readable storage medium of claim 15, wherein the operations further comprise: determining the maximum stress limit if the service level during a stress configuration indicates degradation sufficiently large enough that if selected again for a longer time period, the maximum stress limit fails to have an unobtrusive effect on service levels.

20. The non-transitory machine-readable storage medium of claim 15, wherein the operations further comprise:
determining if a previous stress configuration impacted service levels and, if said impact exists, then determine a maximum stress limit;
avoiding the stress configuration if a stress level metric of the stress configuration exceeds the maximum stress limit; and
increasing time duration of stress configurations whose stress level remains below the maximum stress limit.

* * * * *